United States Patent [19]

Sugimoto

[11] Patent Number: 4,815,722
[45] Date of Patent: Mar. 28, 1989

[54] DOCUMENT FEEDING DEVICE

[75] Inventor: Sabio Sugimoto, Nara, Japan

[73] Assignee: Sharp Kabushiki Kaisha, Osaka, Japan

[21] Appl. No.: 836,142

[22] Filed: Mar. 4, 1986

[30] Foreign Application Priority Data

| Mar. 4, 1985 [JP] | Japan | 60-43285 |
| Mar. 4, 1985 [JP] | Japan | 60-43286 |
| Mar. 4, 1985 [JP] | Japan | 60-43287 |

[51] Int. Cl.⁴ .............................................. B65H 3/06
[52] U.S. Cl. .................................. 271/3.1; 271/171; 271/291; 271/301; 271/902; 271/223
[58] Field of Search ............... 271/3.1, 291, 186, 902, 271/301, 171, 223

[56] References Cited

U.S. PATENT DOCUMENTS

| 4,229,101 | 10/1980 | Hamlin | 271/3.1 X |
| 4,278,344 | 7/1981 | Sahay | 271/3.1 X |
| 4,456,237 | 6/1984 | Buddendeck | 271/291 X |
| 4,544,148 | 10/1985 | Kitajima | 271/291 X |
| 4,579,325 | 4/1986 | Pinckney | 271/291 X |

Primary Examiner—Richard A. Schacher
Attorney, Agent, or Firm—Birch, Stewart, Kolasch & Birch

[57] ABSTRACT

The present invention is directed to a document feeding device which operates in such manner that documents loaded are carried forward in order of the lowermost one and upward and each document, after having been scanned, is discharged with its scanned surface up onto the uppermost one of the loaded documents, and therefore, it can be employed not only as an automatic document feeder, but also as a recirculating document handler which enables arrangement of copies in paging order.

3 Claims, 4 Drawing Sheets

DOCUMENT FEEDING DEVICE

BACKGROUND OF THE INVENTION

This invention relates to a document feeding device for feeding originals automatically to an optical scanning position.

In electrophotographic copying, an image of an original is subjected to exposure on a recording medium and changed to a certain polarity, for formation of an electrostatic latent image. The electrostatic latent image so formed is developed with a colorant toner, and the developed image (toner image) is transferred onto a transfer medium (ordinary paper or the like) and fed in suitable manner. The toner image on the transfer medium, being still unfixed as such, is fixed on the transfer medium by the medium being conveyed to a fixing station after image transfer.

In such electrophotographic copying, an original to be copied is placed on a document scan surface. In this case, such document is manually placed on the scan surface. In order to eliminate such manual work, the general practice is to add to the copying machine an automatic document feed device designed so that documents placed on a certain tray are automatically fed one by one for delivery through a conveyor device onto the document scan surface. With such an arrangement it is possible to eliminate such manual work as replacement of an original with a new one upon completion of one copying work, and also to substantially reduce the copying time involved.

Various kinds of improvements have been made with aforesaid automatic document feed device. One recent development is seen in Japanese Published Examined Patent Application No. 59-7102, in which there was proposed a device called "automatic document feeder". This device permits copying of not only single-sided documents, but also double-sided documents. More particularly, the device is such that documents on a loading board (tray) are separated and fed sequentially from the upper most one thereof, each document being taken off after having been delivered onto the scan surface. In this case, documents to be taken off are delivered onto a take-off tray provided separately from the loading tray. Therefore, this device is applicable for use as an ordinary type automatic document feeder, and cannot be employed as a device of such type as is recently known as recirculating document handler. The recirculating document handler is of such arrangement that documents are sequentially fed onto a scan surface and subsequently returned to a document loading board so that they may be again fed onto the scan surface.

SUMMARY OF THE INVENTION

The present invention has as its object the provision of a document feeding device which permits copying of double-sided documents, and which functions not only as an automatic document feeder, but also as a recirculating document handler. According to one preferred embodiment of the present invention, there is provided a document feeding device comprising a document loading board for loading thereon a multiplicity of documents at a time, a separator-feeder means for separating and conveying from said loading board the documents thereon sequentially from the lowermost one thereof, a document transport means for conveying each document conveyed by said separator feeder means to a document scanning position, and a take-off transport means which conveys each document after it is scanned at said document scanning position and which reverses the direction of document travel for unloading the document onto the uppermost document on said loading board so that the document may be placed with its image face on same side as the document of said loading board.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

Before proceeding with the description of the present invention it is to be noted that like parts are designated by like reference numerals throughout the accompanying drawings.

Figure 1:
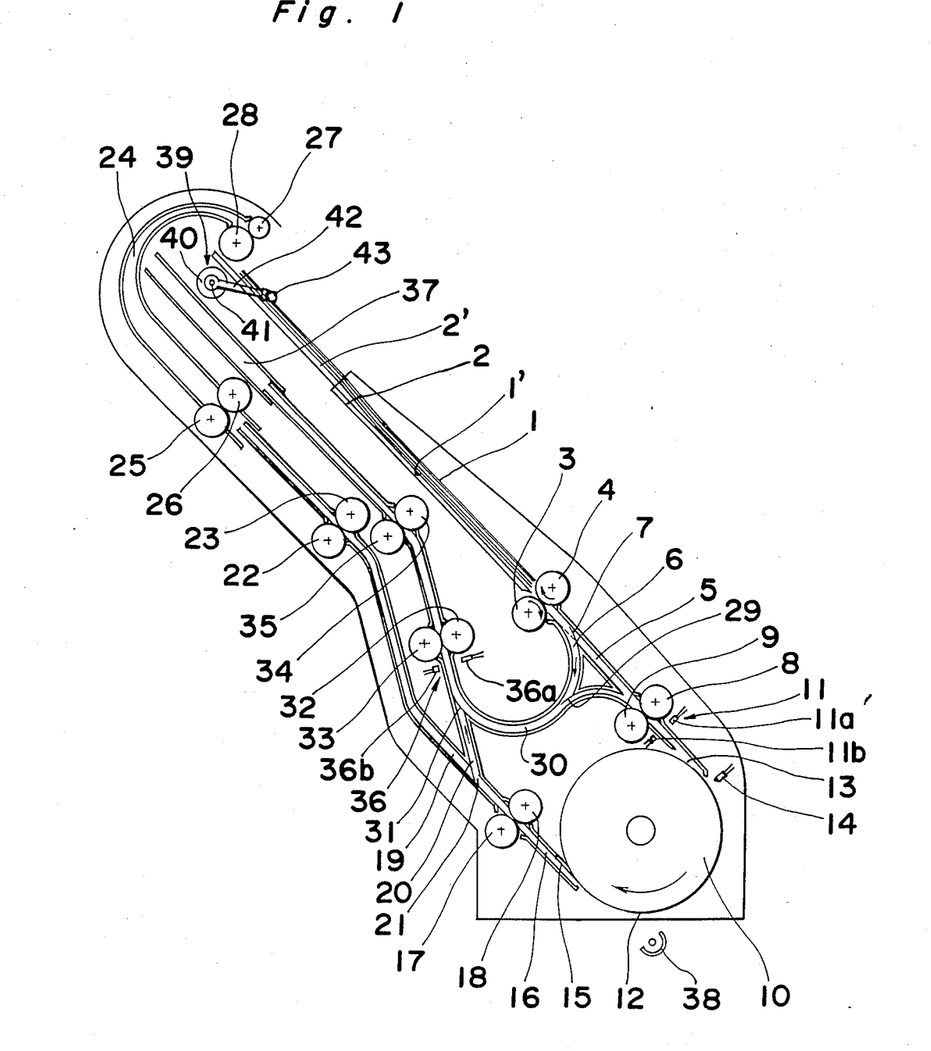
FIG. 1 is a sectional view showing a first embodiment of the automatic document feeding device according to the present invention.

FIG. 1 is sectional view showing the first embodiment of the automatic document feeding device according to the invention. Documents 1 are to be copied are multiple loaded on a document loading board 2, with their copying face down. In front of the loading board 2, and in the direction of document feed, there are provided a feed roller 3 and a separator roller 4, by means of which documents are separated one by one beginning from the lowermost one thereof and thus fed into a feed passage 5. The feed roller 3 is rotated in the direction of feed of document 1, while the separator roller 4 is rotated in such a direction as will reverse toward the loading board 2 any documents carried in plurality by the feed roller. At a mid-course point of the feed passage 5, there is formed a reverse transport passage 6 for reversing the direction of feed of document 1, and at a parting of this reverse transport passage 6 and the feed passage 5 there is disposed a changeover gate 7 for switching to either of the passages 5 or 6 for feed control. The changeover gate 7 is swivellably supported at one end thereof so that either one of the passages may be closed.

In front of aforesaid passage 5 there are provided feed rollers 8 and 9 which feed document 1 in transit onto a repeat rotator 10 for delivering the same to a document scanning position. An optical detector device (sensor) 11 for detecting the presence of a document is disposed at an outlet location of the feed rollers 8, 9. The optical detector device 11 comprises emitter and receptor elements 11a, 11b disposed across the document feed passage, so that the presence of document 1 may be detected by light reception into the receptor element 11b being interrupted by the document in transit. Document 1 fed through the feed rollers 8, 9 is wrapped on the periphery of the repeat rotator 10 and is delivered to the document scanning position 12 as the rotator 10 rotates. The repeat rotator 10 is drum-shaped so that a document may be carried thereon by being attracted onto the outer periphery of the drum-shaped rotator. For the purpose of document attraction, for example, methods such as electrostatic attraction or air suction may be employed. Attraction of document 1 onto the repeat rotator 10 occurs as its front end reaches an attraction initiation point 13, and the document is delivered to the scanning position 12 while being held as attracted onto the outer periphery of the rotator 10. A detector 14 for detecting the front end of document 1 is disposed at a suitable location and in opposed relation to the repeat rotator 10 in the course of document feed. The front end detector (sensor) 14 issues a detection signal, which serves as a synchronizing signal for feed of a transfer medium on the main body side of the copying machine.

At a location past the document scanning position 12, and in opposed relation to the repeat rotator 10, there is disposed a release pawl 15 for removing the document 1 from the repeat rotator 10, held under attraction thereto, after its having passed the scan position. The release pawl 15 is caused to abut the repeat rotor 10 only when removing a document, and at any other time it is kept away from the repeat rotator 10. Therefore, if a document on the repeat rotator 10 passes by the release pawl 15 when the latter is held away, such document is again conveyed to the document scanning position without being released. Document 1 released by aforesaid pawl 15 is fed into a take-off passage 16. Feed rollers 17, 18 for further transport of document 1 are disposed on the take-off passage 16.

At an outlet point of aforesaid feed rollers 17, 18, there is provided a take-off passage 19 for discharge of document 1 and a reversal feed passage 20 for reversing the direction of transport of document 1 for feeding the document again onto the repeat rotator 10. A changeover gate 21 for switching the direction of feed of document 1 is swivellably provided at a parting of these two passages. As shown by dotted line, if the changeover gate 21 closes the reversal feed passage 20, document 1 is conveyed along the take-off passage 19, through the feed rollers 17, 18. At a mid-course point of aforesaid take-off passage 19 there are disposed first take-off rollers 22, 23 for returning document 1 to the document loading board 2. In addition, there is provided a connecting reversal (return) take-off passage 24 which is connected to the take-off passage 19. Second and third take-off rollers 25, 26 and 27, 28 for taking off document 1 are provided on this connecting reversal take-off passage 24. For the purpose of delivering document 1 onto the document loading board 2, the third take-off rollers 27, 28 are so disposed that they are opposed to the rear end of the loading board 2 as seen in the direction of document feed. Accordingly, documents 1 are piled up one after another on top of the uppermost document on the loading board 2.

The reversal feed passages 6 and 20 which are opened and closed by means of the changeover gates 7 and 21 are designed for use in the case where document 1 is a double-sided one, in order to enable copying of such double-sided document. The reversal feed passage 6 is connected at the forward extremity thereof to a document feed reversal track 30 through a fixed gate 29 which is formed of a resilient material, such as polyethylene terephthalate. Similarly, the reversal feed passage 20 is connected to aforesaid document feed reversal track 30 through a fixed gate 31 formed of a resilient material such as polyethylene terephthalate. The fixed gates 29, 31 are adapted to permit the entry of documents in the direction of the arrow shown, but to restrict the transport of documents in the opposite direction. The document feed reversal track 30 is connected to an approach to the feed rollers 8, 9, and on the opposite side of the track there are disposed first and second reversible feed rollers 32, 33 and 34, 35.

A document sensor 36 for detecting the presence of document 1 is disposed on the document entry side of aforesaid first feed rollers 32, 33. This sensor 36 comprised emitter and receptor elements 36a, 36b disposed across the reversal feed track 30, and is designed so that if any document to be carried through the feed rollers 32, 33 has passed an optical path, the receptor element 36b receives light from the emitter element 36a, whereby the document is detected. The document sensor 36 is employed for the purpose of reversing the direction of rotation of the first and second feed rollers 32, 33 and 34, 35 through rear end detection. Further, the sensor 36 allows the document 1 to be fed in the direction of feed thereof by detecting the front end of the document. There is provided a store passage 37 connected to the document feed reversal track 30 and intended for documents in transit being temporarily guided thereinto.

In order to help better understand the characteristic features of the above described automatic document feeding device, the manner of operation thereof will now be described in due order.

Firstly, use of the device as automatic document feeder as in usual cases will be explained. Now, it is assumed that single-sided documents 1 are placed on the document loading board 2, with their image face up. In this condition of the device, if a copying switch on the main body side of the copying machine is manipulated, the feed roller 3 and the separator roller 4 are rotated in the direction of the arrow shown to convey forward the lowermost document 1', is conveyed forward, which is passed through the feed passage 5 and then delivered to the document attraction initiation point 13 of the repeat rotator 10 through the feed rollers 8, 9. In this case, the changeover gate 7 is positioned at a position shown by dotted line to keep the feed passage 5 open, since single-sided copying is required. The changeover gate 21 is likewise positioned at a position shown by a dotted line.

The repeat rotator 10 holds the document 1' in position on its outer periphery by allowing the non-image face of the document to be attracted thereto by the action of an electrostatic attraction means, for example. The document 1', so held on the repeat rotator 10, passes the document scanning position 12 as the rotator 10 rotates in the direction of the arrow. Now, an illuminator 38 which illuminates the image face of the document is disposed opposite to the scanning position; and reflected light from the document 1 under the illumination, with the aid of an optical system, allows the image of the document to be formed in order on a recording medium under rotation. As the document 1' passes the scanning position 12, the image of the document is exposed on the recording medium not shown; this process is repeated for the required number of copies. That is, the repeat rotator 10 rotates the number of times corresponding to a preset number of copies.

After the document has been scanned for the required number of copies, the release pawl 15 abuts with the repeat rotator 10 to remove the document 1' from the rotator 10, the document 1' being then guided to the take-off passage 16. As stated earlier, the release pawl 15 is in abutment with the periphery of the repeat rotator 10 for release operation only when removal of document 1' is required, but it is kept away from the repeat rotator 10 until document scanning has been completed for the required number of copies. Therefore, during document scanning, document 1' passes by the location of the release pawl 15 while remaining attracted to the rotator 10.

The document 1' guided along aforesaid take-off passage 16 is fed into the take-off passage 19 through the feed rollers 17, 18, and further, under the drive force of the first, second, and third take-off rollers 22, 23, 25, 26, and 27, 28, it is unloaded for placement on top of the uppermost document 1 on the document loading board 2.

When the rear end (relative to the direction of feed) of the document 1', held in position on the repeat rotator 10 under the force of attraction, is detected by the document sensor 14, the feed roller 3 and the separator roller 4 are driven again, and the feed rollers 8, 9 are also driven, so that a subsequent document 1 is conveyed to the feed rollers 8, 9 through the feed passage 5. When the front end of this subsequent document 1 so conveyed is detected by the sensor 11, the feed roller 3, separator roller 4, and the feed rollers 8, 9 stop rotating, and thus, the subsequent document 1 is caused to stand by at the sensor 11 position. The document 1 on standby is held at that position until the document 1' has been subjected to final document scanning, with its rear end detected by the sensor 14, whereupon the feed rollers 8, 9 are driven again. The document 1 which has been on standby is now conveyed to the attraction initiation point 13 of the repeat rotator 10 and attracted onto the repeat rotator 10, being thus ready for document scanning. When the rear end of this subsequent document 1 on the repeat rotator 10 passes the sensor 14, the feed roller 3 and separator roller 4 are driven again to initiate separation and feed of a further subsequent document, which is thus fed up to the sensor 11 position and is then caused to stand by.

Through repetition of such operation as above described, documents 1 on the loading board 2 are fed to the document scanning position 12 one after another beginning with the lowermost one, and are subsequently returned to the loading board as they are originally placed. In this conjunction, it is necessary to identify which document is a final one, because each document 1 returned is placed on top of the documents 1 piled on the board. For this purpose, a document detecting device 39 is provided on the loading board. The detecting device 39 has, for example, a small motor 40, an arm 42 fixed to and held by an output shaft 41 of the motor 40, and a rotatable pin 43 connected to the front end of the arm 42, which pin is rotatable about the axis of the arm in one direction only and held in position by a spring or the like in a direction opposite from the direction of its rotation when no force is applied thereon. Now, if documents 1 are placed on the loading board 2 and a copy start switch is turned on, the output shaft 41 is rotated in the direction of the arrow shown, and the arm 42 fixed to the output shaft 41 is swivelled in the direction of the arrow accordingly. Whilst, the pin 43 rotates downwardly about the axis of the arm 42 when it contacts the underside of piled documents. The output shaft 41 continues to rotate in the direction of the arrow until a predetermined position is reached, and the pin 43 springs up to horizontal position under the force of a reset spring (not shown) as soon as it goes out of contact with any document After having turned to a predetermined angle, the small motor 40 is disconnected from power supply and becomes free, and under the dead weight of the arm 40, etc., it rotates counter to aforesaid direction of rotation until setting is completed in manner that the pin 43 mounts on the top of the documents 1. Each exposed document is discharged onto the pin 43, and when the uppermost one of the initially piled documents is separated and conveyed forward, the arm 42, under its own weight, rotates about the output shaft 41 in a direction opposite from the arrow until the pin 43 drops into an opening formed in the document loading board 2, it being thus possible to detect the fact that the last document is no longer present. For the purpose of such detection, motor output during the downward rotational movement of the arm 42 and pin 43 may be utilized; alternatively, a photosensor or the like may be provided in the path of downward movement of the arm 42 and pin 43 in order to utilize an output signal therefrom.

The feed of last one of the piled documents is detected in manner as above described, and upon completion of scanning of the last document, such a document is returned to the loading board 2 for placement thereon. Again, the copy switch is manipulated, and the motor 39 rotates so that the arm 41 and pin 42 contact with the uppermost document 1 and stop, whereby there being no document left is detected when the last document is delivered.

Next, operation in the case where documents each having images formed on both sides thereof are to be copied will be explained. In such case, the double-sided documents are piled on the loading board 2 so that the first page (front side) of the documents is positioned uppermost with its face up. In order to copy both sides of the individual documents and arrange copies in order of page number, therefore, it is necessary to begin copying with the second surface of the lowermost document 1' (which is opposite to the loading board 2). Accordingly, upon the copy switch being turned on, the feed roller 3 and separator roller 4 rotate to separate and convey the lowermost document 1', and in this conjunction, the lowermost document 1' is guided to the reversal feed passage 6 for the purpose of second surface copying. That is, in the case of double-sided documents being copied, the changeover gate 7 is positioned as shown by solid line under mode designation for the purpose. Therefore, the separated and conveyed document is guided along the changeover gate 7 into the reversal feed passage 6, then passing through the fixed gate 29 into the document feed reversal track 30.

The document 1', guided into aforesaid document feed reversal track 30, is detected at its front end by the sensor 36, when the reversible first feed rollers, 32, 33 and second rollers 34, 35 rotate, whereby the document is conveyed into the reversal store passage 37. When the rear end of the document 1' is detected by the sensor 36, disposed at the entry to the first feed rollers 32, 33, said first rollers 32, 33 and the second feed rollers 34, 35 are driven to rotate in reverse direction. Thus, the direction of feed of the document 1' is reversed so that the rear end of the document 1' is positioned at forward side, the document 1' being thus conveyed along the reversal feed track 30 in a direction opposited from its previous direction of travel. In this reverse travel, the document 1' is conveyed along the fixed gate 31, 29 into the clearance between the feed rollers 8, 9. Thereafter, as is the case with a single-sided document, the document 1' is conveyed to the repeat rotator 10 so that it is attracted to the outer periphery of the rotator 10. The document 1' so attracted passes the document scanning position 12 as the repeat rotator 10 rotates, so that the image of its second surface is first exposed for copying.

When the document 1' has passed the document scanning position 12 the number of times corresponding to the preset number of copies, it is removed from the repeat rotator 10 by means of the release pawl 15 and is guided into the take-off passage 16. The document 1' which has passed through such scanning process is conveyed through the feed rollers 17, 18 into the reversal feed passage 20 along the changeover gate 21. At this moment, the changeover gate 21 is closed on the take-off passage 19 side for the purpose of copying the image on the first face of the double-sided document 1'. Accordingly, the document 1' is guided to the reversal feed passage 20 and further conveyed into the document feed reversal track 30 through the fixed gate 31. The document 1' thus guided into the reversal feed track 30 is conveyed into the reversal store space 37 by the first and second feed rollers 32, 33, and 34, 35.

When the rear end of the document 1' in the direction of feed is detected by the sensor 36, the first and second feed rollers 32, 33, and 34, 35 are caused to reverse the direction of their rotation, so that the document 1' is transported along the reversal feed track 30 in a direction opposite from its previous direction of travel. In consequence of the direction of feed of the document 1' being reversed again in this way, the first-page image side of the document 1' is turned upward. The document 1' is conveyed to the repeat rotator 10, by which it is brought to the document scanning position 12 at which the image on its surface is exposed on a recording medium. After having been so exposed, the document 1' is removed from the repeat rotator 10 and then conveyed by the feed rollers 17, 18 into the take-off passage 20. At this moment the changeover gate 21 is so positioned as to close the reversal feed passage 20, so that the document 1' is conveyed further upward along the take-off passage 19; and under the action of the first, second, and third take-off rollers and through the reversal take-off connection passage, the document 1' is finally discharged onto the uppermost document on the loading board 2. In this instance, the document is discharged with its last copied surface up.

Referring now to the manner of feeding a subsequent double sided document, when the document 1' (preceding document), the second surface of which has been copied, is conveyed toward the repeat rotator 10 and attracted thereto, the sensor 36 detects the rear end of the document 1', whereupon the feed roller 3 and separator roller 4 are driven to separate and convey forward such subsequent document. Again, when the front end of the subsequent document in the direction of feed is detected by the sensor 36, the first and second feed rollers 32, 33, and 34, 35 are rotated so as to transport the document toward the reversal store space 37. Accordingly, the subsequent document is transported through the reversal feed passages 6, 30 in same way as aforesaid document 1'. When the document is reversed in direction of feed and its front end carried by the feed rollers 8, 9 is detected by the sensor 11, the document is caused to stop travelling and stand by at that point. Subsequently, upon completion of front face copying of the preceding document, the feed rollers 8, 9 are driven so that the subsequent document is fed onto the repeat rotator 10.

Described above is the manner of operation of the device as an automatic document feeder. Next, recirculating document handling will be explained. Recirculating document handler operation does not scan each document a preset number of times in succession for a preset number of copies and is thereafter returned to the document loading board 2; but rather it is such that each time the document has been scanned, it is returned to the loading board 2 and this same process is repeated a preset number of times to obtain a preset number of copies. In this case, each set of copies delivered is arranged in order of page number according to the page order of the originals. That is, a sorting function is provided.

In a recirculating document handler operation, the manner of document separation and feed is same as that in automatic document feeder; therefore, a description is omitted of the manner of document feed. It is noted, however, that the document 1 to be copied is attracted to the repeat rotator 10, allowed to pass the document scanning position 12 while being carried in rotation, and thereafter, it is removed and returned to the loading board; or, in the case of double-side copying, the document is removed upon completion of back-side scanning and then conveyed into the reversal feed passage 20. The document, when it is returned to the loading board 2, is discharged onto the uppermost document on the board, with that side thereof which has just been copied. Accordingly, same document may be again fed to the document scanning position 12 as it is, it being thus possible to employ the device as a recirculating document handler. Therefore, in the case where no sorter is provided and where arrangement in paging order is required, the device illustrated in FIG. 1 may be employed as a recirculating document handler; or, in the case where arrangement in paging is not required or where a sorter is provided, the device may be optionally used as an automatic document feeder.

Figure 2:
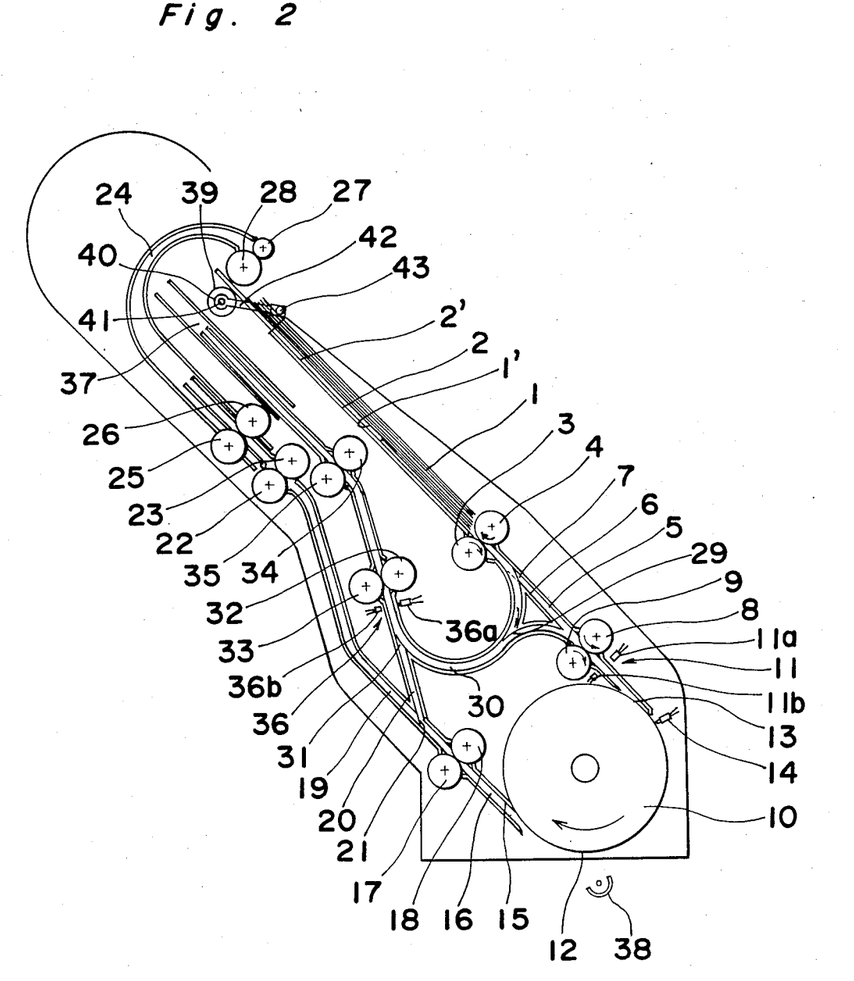
FIG. 2 is a section showing the automatic document feeding device in FIG. 2 in the case where documents are of a smaller size.

In the FIG. 1 device, it is noted that documents 1 placed on the loading board 2 may not always be of same size. Especially, where the documents are smaller in size than those shown in the drawing, they may not always be discharged in stable manner. Therefore, the device is of such arrangement that relative positions of the document loading board 2 and take-off rollers 27, 28 may be varied according to the individual sizes of documents loaded. For example, it is arranged that each document may be discharged at an upper point in the case where it is of relatively large size, and at a lower point in the case where it is of relatively small size. FIG. 2 shows one aspect of the arrangement, where documents are small in size. It can be seen from the figure that the point of discharge has been lowered as a result of the reversal take-off connection passage 24, reversal store space 37, second take-off rollers 25, 26, and third take-off rollers 27, 28 being caused to slide respectively. For such movement, arrangement may be made in such a way that the size of documents loaded is automatically detected by means of a sensor (not shown) so that the point of discharge may be changed automatically, or it may be arranged to enable the operator to make necessary adjustment by hand.

In order to allow aforesaid slide movement, the second and third take-off rollers 25, 26, 27, 28, reversal take-off connection passage 24, reversal store space 37, and a document detecting device 38 including a mini-motor 39 may be arranged on a same support structure mounted slidably on a main support structure which supports members other than aforesaid in FIG. 1. In this conjunction, as shown in the drawing, the reversal take-off connection passage 24 and reversal store space 37 are formed larger relative to the take-off passage 19 and reversal feed track 30 so that no inconvenience may be caused in connection with such sliding. Further, the document loading board 2 consists of two parts, board 2 and board 2' being slidable relative thereto, which board 2' is slidable in conjunction with aforesaid slide movement. The above described document feeding device operates in such manner that documents loaded are carried forward in order of the lowermost one and upward and each document, after having been scanned, is discharged with its scanned surface up onto the uppermost one of the loaded documents, and therefore, it can be employed not only as an automatic document feeder, but also as a recirculating document handler which enables arrangement of copies in paging order.

Figure 3:
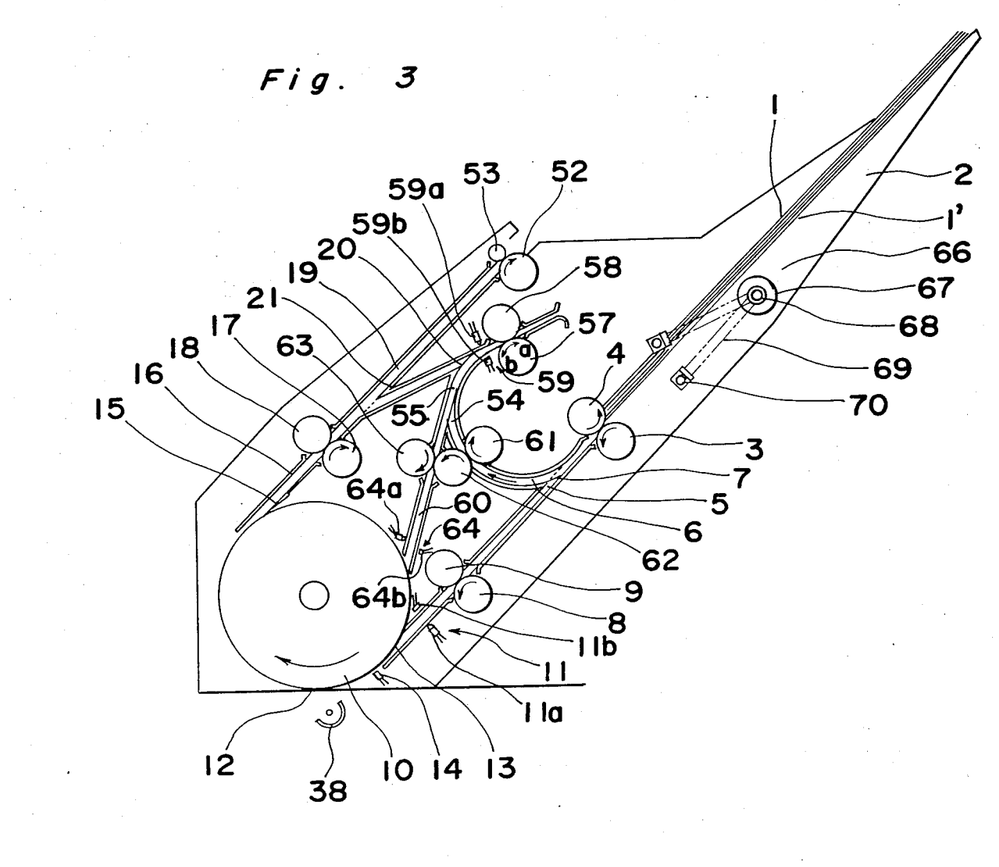
FIG. 3 is a sectional view showing a second embodiment of the automatic document feeding device according to the present invention.

FIG. 3 is a sectional view showing a second embodiment of the automatic document feeding device according to the invention. In this second embodiment, components referred to as document 1 through changeover gate 21 are identical with the corresponding ones in the first embodiment, and therefore, a description is omitted of those components. In FIG. 3, there are provided, at an outlet point of aforesaid feed rollers 17, 18, a take-off passage 19 for discharge of document 1 and a reversal feed passage 20 for reversing the direction of feed of document 1 for feeding the document again onto the repeat rotator 10. A changeover gate 21 for switching the direction of feed of document 1 is swivellably provided at a parting of these two passages. If, as shown by a dotted line, the changeover gate 21 closes the reversal feed passage 20, document 1 is conveyed along the take-off passage 19 through the feed rollers 17, 18, being then returned to the document loading board 2 by means of take-off rollers 52, 53 disposed at the forward end of the take-off passage 19. For the purpose of delivering the document 1 onto the loading board 2, the take-off rollers 52, 53 are disposed in opposed relation to the head of the loading board 2. Therefore, documents 1 are piled up one after another on top of the uppermost document on the loading board 2.

The reversal feed passages 6 and 20 which are opened and closed by the changeover gates 7 and 21 are provided for reversal feed of document 1 and for feed to the repeat rotator 10 of document so reversed. The reversal feed passage 6 is connected at the forward extremity thereof to a document feed reversal track 55 through a fixed gate 54 which is formed of a resilient material, such as polyethylene terephthalate. Similarly, the reversal feed passage 20 is connected to aforesaid document feed reversal track 55 through a fixed gate 56 formed of a resilient material such as polyethylene terephthalate. The fixed gates 54, 56 are adapted to permit the entry of documents in the direction of the arrow shown, but to restrict the transport of documents in the opposite direction. In the document feed reversal track 55 there are disposed reversible feed roller 57, 58.

A document sensor 59 for detecting the presence of document 1 is disposed on the document entry side of aforesaid first feed rollers 57, 58. This sensor 59 comprises emitter and receptor elements 59a, 59b disposed across the reversal feed track 55, and is designed so that if any document to be carried through the feed rollers 57, 58 has passed an optical path, the receptor element 59b receives light from the emitter element 59a, whereby the document is detected. The document sensor 59 is employed for the purpose of reversing the direction of rotation of the feed rollers 57, 58 through rear end detection. Further, the sensor 59 allows the document 1 to be fed in the direction of feed thereof by detecting the front end of the document. There is provided a feed passage 60 connected to the document feed reversal track 55 and intended to feed the document 1 to the repeat rotator 10.

Feed rollers 61, 62 for feeding document 1 into the reversal feed track 55 are disposed in the reversal feed passage connected to the reversal feed track 55 through the fixed gate 54. At a junction between the reversal feed track 55 and the feed passage 60, a feed roller 63 for feeding document 1 toward the repeat rotator 10 is disposed in face-to-face relation to aforesaid roller 62. A document sensor 64 for detecting a document conveyed along the feed passage 60 is disposed in said passage 60 at a location adjacent the repeat rotator 10. This sensor 64 comprises an emitter element 64a and a receptor element 64b disposed across the feed passage 60.

In order to help better understand the characteristic features of the automatic document feeding device constructed as described above, the manner of operation thereof will now be described in due order.

Firstly, use of the device as an automatic document feeder as in usual cases will be explained. Now, it is assumed that single-sided documents 1 are placed on the document loading board 2, with their image face up, that is, with their non-image face opposed to the loading board 2. In this condition of the device, if a copying switch on the main body side of the copying machine is manipulated, the feed roller 3 and the separator roller 4 are rotated in the direction of the arrow shown to convey forward the lowermost document 1' on the loading board 2. Thus, one of the documents piled on the board, or a last page document 1', is conveyed forward. In this case, the image face of the document 1 is on the up side, and therefore, if the document is fed as it is to the repeat rotator 10, the non-image side thereof is exposed. In the case of single-sided document feed for copying, therefore, the changeover gate 7 is prepositioned at a position shown by solid line. Whilst, the changeover gate 21 is positioned as shown by broken line.

As such, the document 1' separated and conveyed forward is led into the reversal feed passage 6 and is then guided by the action of the feed rollers 61, 62 into the reversal feed track 55 through the fixed gate 54. The document 1' is conveyed upward along the reversal feed track 55 and its front end is detected by the sensor 59. Upon detection by the sensor 59 of the front end of the document, the reversible feed rollers 57, 58 are rotated in direction a and the document 1' is conveyed further in same direction. In the course of its travel, the document 1' has its rear end detected by the sensor 59. Thereupon, aforesaid feed rollers 57, 58 are rotated in direction b, and thus the direction of feed of the document 1' is reversed.

The document 1' having its direction of feed so reversed is now conveyed in a direction opposite from its previous course of travel, with its rear end on the leading side, and is fed by the feed rollers 62, 63 to the repeat rotator 10 through the passage 60. The repeat rotator 10 holds the document 1' in position on its outer periphery by allowing the non-image face of the document to be attracted thereto by the action of electrostatic attraction means, for example. The document 1' so held on the repeat rotator 10 passes the document scanning position 12 as the rotator 10 rotates in the direction of the arrow. Now, an illuminator 65 which illuminates the image face of the document is disposed opposite to the scanning position; and reflected light from the document 1 under the illumination, with the aid of an optical system, allows the image of the document to be formed in order on a recording medium under rotation. As the document 1' passes the scanning position 12, the image of the document is exposed on the recording medium not shown; this process is repeated for the required number of copies. That is, the repeat rotator 10 rotates the number of times corresponding to a preset number of copies.

After the document has been scanned for the required number of copies, the release pawl 15 abuts with the repeat rotator 10 to remove the document 1' from the rotator 10, the document 1' being then guided to the take-off passage 16. As stated earlier, the release pawl 15 abuts with the periphery of the repeat rotator 10 for release operation only when removal of document 1 is required, but it is kept away from the repeat rotator 10 until document scanning has been completed for the required number of copies. Therefore, during document scanning, document 1' passes by the location of the release pawl 15 while remaining attracted to the rotator 10.

The document 1' guided along aforesaid take-off passage 16 is fed into the take-off passage 19 through the feed rollers 17, 18, and further under the drive force of the take-off rollers 52, 53 it is unloaded for placement on top of the uppermost one of the documents 1 on the document loading board 2. In this case, the document 1' is placed with its image side up, needless to say.

When the rear end (relative to the direction of feed) of the document 1', held in position on the repeat rotator 10 under the force of attraction, is detected by the document sensor 59, the feed roller 3 and the separator roller 4 are driven again, and the feed rollers 61, 62 are also driven, and thus, a subsequent document 1 is conveyed into the reversal feed track 55 through the reversal feed passage 6. Thereafter, as already explained, the subsequent document 1 is reversed in its direction of feed and is fed by the feed rollers 62, 63 to the repeat rotator 12, with its rear side on the leading side. When the front end of the subsequent document 1 thus conveyed is detected by the sensor 64, the feed rollers 63, 63 stop rotating, and thus the subsequent document 1 is caused to stand by at the sensor 64 position. In this case, the feed roller 64 is at a stop, and naturally the feed roller 3 and separator roller 4 are also at a stop in the course of document feed. When the document 1' is subjected to final document scanning, with its rear end detected by the sensor 14, the feed rollers 62, 63 are driven again, and accordingly the document 1 on standby is conveyed to the repeat rotator 10 and attracted thereto, being then subjected to document scanning. When the rear end of this subsequent document 1 has passed the sensor 59, the feed roller 3 and separator roller 4 are driven again to initiate separation and feed of a further subsequent document, which document is accordingly conveyed up to the sensor 64 position and is caused to stand by.

Through repetition of such operation as above described, documents 1 on the loading board 2 are fed to the document scanning position 12 one after another beginning with the lowest one, and are subsequently returned to the loading board as they are originally placed. In this conjunction, it is necessary to identify which document is a final one, because each document 1 returned is placed on the top of the documents 1 piled on the board. For this purpose, a document detection device 66 is provided on the loading board.

The detection device 66 has, for example, a mini-motor 67, an arm 69 fixed to and held by an output shaft 68 of the motor 67, and a rotatable pin 70 connected to the front end of the arm 69, which pin is rotatable about the axis of the arm in one direction only and held in position by a spring or the like in a direction opposite from the direction of its rotation when no force is applied thereon. Now, if documents 1 are placed on the loading board 2 and a copy start switch is turned on, the output shaft 68 is rotated in the direction of the arrow shown, and the pin 69 fixed to the output shaft 68 is swivelled in the direction of the arrow accordingly. Whilst, the pin 70 rotates downwardly about the axis of the pin 69 when it contacts the underside of piled documents. The output shaft 68 continues to rotate in the direction of the arrow until a predetermined position is reached, and the pin 70 springs up to horizontal position under the force of a reset spring (not shown) as soon as it goes out of contact with any document. After having turned a predetermined angle, the mini-motor 67 is disconnected from power supply and becomes free, and by its own weight it rotates counter to aforesaid direction of rotation until setting is completed in manner that the pin 70 mounts on the top of the documents 1.

Each exposed document is discharged onto the pin 70, and when the uppermost one of the initially piled documents is separated and conveyed forward, the arm 69, etc., by their own weight, rotate about the output shaft 68 in a direction opposite from the arrow until the pin 10 drops into an opening formed in the document loading board 2, it being thus possible to detect the last document being no longer present. For the purpose of such detection, motor output during the downward rotational movement of the arm 69 and pin 70 may be utilized; alternatively, a photosensor or the like may be provided in the path of downward movement of the arm 69 and pin 70 in order to utilize an output signal therefrom.

The feed of last one of the piled documents is detected in manner as above described, and upon completion of scanning of the last document, such document is returned to the loading board 2 for placement thereon. Again, the copy switch is manipulated, and the motor 67 rotates so that the arm 69 and pin 70 contact with the uppermost document 1 and stop, whereby there being no document left is detected when the last document is delivered. In this conjunction, when the last document 1 is conveyed forward, it is possible to know the number of documents piled on the loading board 2 by counting the number of sheets previously sent out. Alternatively, it is possible to know the number of documents automatically by non-copy feeding documents 1 before the start of copying.

Next, operation in the case where documents each having images formed on both sides thereof are to be copied will be explained. In such case, the double-sided documents are piled on the loading board 2 so that the first page (front side) of the documents is positioned uppermost with its face up. In order to copy both sides of the individual documents and arrange copies in order of page number, therefore, it is necessary to begin copying with the second surface of the lowermost document 1' (which is opposite to the loading board 2). Accordingly, upon the copy switch being turned on, the feed roller 3 and separator roller 4 rotate to separate and convey the lowermost document 1', and in this conjunction, the lowermost document 1' is guided to the feed passage 5 for the purpose of second surface copying. That is, in the case of double-sided documents being copied, the changeover gate 7 is positioned as shown by broken line under mode designation for the purpose. Therefore, the separated and conveyed document is guided along the changeover gate 7 into the feed passage 5, then being fed into the feed rollers 8, 9.

Said rollers 8, 9 carry therethrough the document 1' so fed, to convey it to the attraction initiation point 13 of the repeat rotator 10. Accordingly, the document 1' is attracted electrostatically, for example, to the outer periphery of the repeat rotator 10. In this case, the document 1' has its surface attracted to the outer periphery of the repeat rotator 10, with its back-side image exposed. The document 1' so attracted to the repeat rotator 10 is carried to the scanning position 12 as it rotates so that the image on the backside of the document 1' is exposed in order.

When the document 1' has passed the document scanning position 12 the number of times corresponding to the preset number of copies, it is removed from the repeat rotator 10 by means of the release pawl 15 and is guided into the take-off passage 16. The document 1' which has passed through such scanning processes is conveyed through the feed rollers 17, 18 into the reversal feed passage 20 along the changeover gate 21. At this moment, the changeover gate 21 is closed on the take-off passage side 19 for the purpose of copying the image on the first face of the double-sided document 1. Accordingly, the document 1' is guided to the reversal feed passage 20 and further conveyed into the reversal feed track 25 through the fixed gate 26. The document 1' thus guided into the reversal feed track 55 is carried further by the feed rollers 57, 58 in the same direction. The feed rollers 57, 58 are rotated in direction a when the front end of the document 1' is detected by the sensor 59 which is disposed on the entry side of said rollers, so that the document 1' is further conveyed in the direction of its ongoing travel.

Subsequently, when the rear end of the document 1' in the direction of its travel is detected by the sensor 59, the feed rollers 57, 58 are caused to reverse the direction of their rotation (into direction b), so that the document ' is transported along the reversal feed track 55 in the reverse direction. In consequence of the direction of feed of the document 1' being reversed in this way, the document 1' is fed to the repeat rotator 10, with its first-page image side turned upward. The document 1' is carried through the feed rollers 62, 63 to the repeat rotator 10, by which it is brought to the document scanning position 12 at which the image on its surface is exposed on a recording medium. After having been so exposed, the document 1' is removed from the repeat rotator 10, and then conveyed by the feed rollers 17, 18 into the take-off passage 19. At this moment, the changeover gate 21 is so positioned as to close the reversal feed passage 20, so that the document 1' is conveyed further upward along the take-off passage 19; and under the action of the take-off rollers 52, 53, the document 1' is discharged onto the uppermost document 1, with its last copied surface side up.

Referring now to the manner of feeding a subsequent double sided document, when the document 1' (preceding document) is fed to the repeat rotator 10 for backside copying and its rear edge is detected by the sensor 11, the feed roller and separator roller 4 are driven to separate and convey forward such subsequent document. This subsequent document so conveyed has its front end detected by the sensor 11 before it is about to be fed by the feed rollers 8, 9 to the repeat rotator 10. Accordingly, the rotation of the feed rollers 8, 9 is stopped, and the subsequent document 1' is caused to stand by, with its front end already detected by the sensor 11. Subsequently, upon completion of surface copying of the preceding document, the feed rollers 8, 9 are driven and the subsequent document is now carried onto the repeat rotator 10.

Described above is the manner of operation of the device as an automatic document feeder. Nextly, recirculating document handling will be explained. Recirculating document handler operation is not such that each document is scanned a preset number of times in succession for a preset number of copies and is thereafter returned to the document loading board 2; but rather it is such that each time the document has been scanned, it is returned to the loading board 2 and this same process is repeated a preset number of times to obtain a preset number of copies. In this case, each set of copies delivered is arranged in order of page number according to the page order of originals. That is, sorting function is provided.

In recirculating document handler operation, the manner of document separation and feed is same as that in automatic document feeder; therefore, description is omitted of the manner of document feed. It is noted, however, that the document 1 to be copied is attracted to the repeat rotator 10, and allowed to pass to the document scanning position 12 while being carried in rotation, and thereafter it is removed and returned to the loading board; or, in the case of double-side copying, the document is removed upon completion of backside scanning and then conveyed into the reversal feed passage 20. The document, when it is returned to the loading board 2, is discharged onto the uppermost document on the board, with that side thereof which has just been copied. Accordingly, the same document may be again fed to the document scanning position 12 as it is, it being thus possible to employ the device as a recirculating document handler. Therefore, in the case where no sorting is provided and where paging arrangement in order is required, the device illustrated in the drawing may be employed as a recirculating document handler; or, in the case where arrangement in paging is not required or where a sorter is provided, the device may be optionally used as an automatic document feeder.

In recirculating document handler use, when a series of scannings are completed with respect to a plurality of piled documents, each document is again conveyed to the document scanning position 12; operation is completed by repeating this process of scanning for a preset number of copies. In this conjunction, it is necessary to detect that the last one of the documents has been sent out, and more specifically, to detect this a number of times corresponding to the required number of copies. To this end, one approach is that when the last document sent out is returned to the document loading board 2, the motor 67 for the document detecting device 66 is driven and then the detecting device 66 is reset to the position as shown in the drawing.

Further, as earlier described, said document detecting device 66 is able to count the number of piled documents. Accordingly, in the case of double side copying, it is possible to copy documents in order of page number through detection of the number of documents. That is, in the case of copying an odd number of documents, the last page document is copied one side only and documents for the remaining pages are copied on both sides, whereby it is possible to copy in order of page number. To this end, also, it is necessary to detect the number of documents by means of the document detecting device 66 so as to ascertain whether the documents are in an odd number or not.

In the device shown in the drawings, the feed roller 62 is opposed to the feed rollers 61, 63 for common service. Other arrangements may be adopted. For example, the feed roller 62 is made exclusive for combination with the feed roller 61, and another feed roller is provided to serve as an exclusive counter roller for the feed roller 63. Through such arrangement, it is possible that when a preceding document is on standby in the feed passage 17, and when the rear end of the document has already passed the sensor 59, the feed rollers 31, 62 are driven to feed a subsequent document into the reversal feed track 55. The above described document feeding device operates in such manner that documents loaded are carried forward in order of the lowermost one and upward and each document, after having been scanned, is discharged with its scanned surface up onto the utmost one of the loaded documents, and therefore, it can be employed not only as an automatic document feeder, but also as a recirculating document handler which enables arrangement of copies in paging order.

Figure 4:
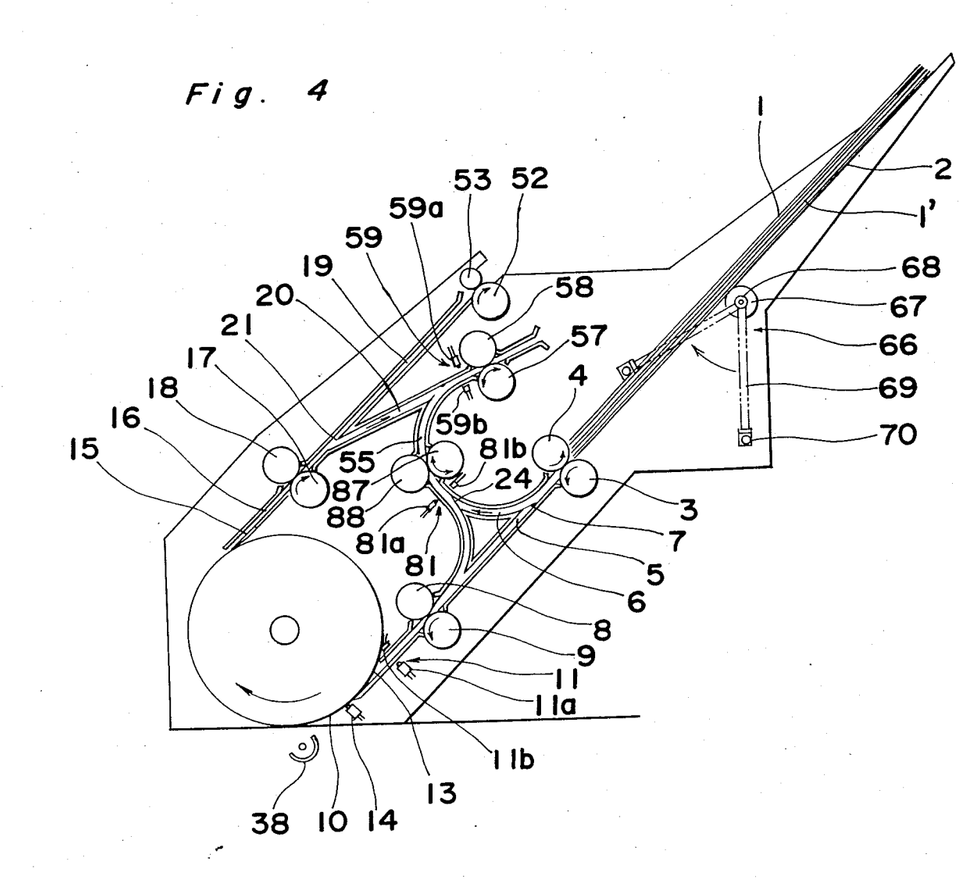
FIG. 4 is a section showing a third embodiment of the automatic document feeding device according to the present invention.

FIG. 4 is a sectional view showing a third embodiment of the automatic document feeding device according to the invention. in this third embodiment, components referred to as document 1 through pin 70 are identical with the corresponding ones in the second embodiment, and therefore, description is omitted of those components.

In FIG. 4, reversal feed passages 6 and 20 which are opened and closed by changeover gates 7 and 21 are provided for reversal feed of document 1 and for feed to the repeat rotator 10 of a document so reversed. The reversal feed passage 6 is connected at the forward extremity thereof to a document feed reversal track 55 through a fixed gate 54 which is formed of a resilient material such as polyethylene terephthalate. Similarly, the reversal feed passage 20 is connected to aforesaid document reversal feed track 55 through a fixed gate 56 formed of a resilient material such as polyethylene terephthalate. The fixed gates 54, 56 are adapted to permit the entry of documents in the direction of the arrow shown, but to restrict the transport of documents in the opposite direction. In the document reversal track 55 there are disposed reversible first and second feed rollers 87, 88, 57, 58. The reversal feed track 55 in particular is connected to an approach to the feed rollers 8, 9 so as to join the feed passage 5.

A document sensor 81 for detecting document 1 is provided on the document entry side of the first feed rollers 87, 88. This sensor 81 comprises emitter and receptor elements 81a, 81b disposed across the reversal feed track 55. When document 1 carried by the feed rollers 87, 88 passes an optical path, the receptor element 81b receives light from the emitter element 81a, whereby the document may be detected. When it detects the front end of the document conveyed, the sensor issues a detection signal to rotate the first and second rollers 87, 57 in direction a. When the rear end of the document 1 is detected by the sensor 81, said feed rollers 87, 57 are driven reverse in direction b.

On the entry side of the second feed rollers 57, 58 there is also provided a document sensor 59 for detecting document 1 conveyed. This sensor comprises emitter and receptor elements 59a, 59b disposed across the reversal feed track 55. The sensor 59 is particularly intended to reverse the direction of feed of the document conveyed through the reversal feed passage 20. In other words, second roller 57 is rotated in direction a when the front end of document is detected; and the roller is rotated in direction b when the rear end is detected, whereupon the first feed roller is also rotated in direction b.

In order to help better understand the characteristic features of the automatic document feeding device constructed as described above, operation of only those portions which are different from the second embodiment will be explained in due order.

Firstly, in the case where the device is employed generally as an automatic document feeder, document 1' separated and delivered is fed into the reversal feed passage 6 and then guided into the reversal feed track 55 through the fixed gate 54. In the course of its travel along the reversal feed track 55, the document 1' has its front end detected by the sensor 81. Upon detection of the front end of the document, the reversible first and second feed rollers 87, 88, 57, 58 are rotated in direction a, and the document is conveyed further in same direction. In the course of transport of the document 1', the rear end of the document is detected by the sensor 81. Accordingly, the first and second feed rollers 87, 88, and 57, 58 are rotated in direction b, and the direction of feed of the document is reversed.

Because of this reversal of direction, the rear end of the document 1' is now on the leading side, and the document is conveyed reverse to its previous course of travel, and by the action of the feed rollers 87, 57 it is guided toward the entry side of the feed rollers 8, 9 which joins the feed passage 5. Then, the document is fed to the attraction initiation point 13 of the repeat rotator 10 through the feed rollers 8, 9.

When the rear end of the document 1' (relative to the direction of feed) attracted to the repeat rotator 10 is detected by the document detecting sensor 81, the feed roller 3 and separator roller 4 are driven, and a subsequent document 1 is conveyed along the reversal feed track 55 through the reversal feed passage 6. Subsequently, as already stated, the direction of feed of the subsequent document 1 is reversed and the document 1' is carried through the first feed rollers 87, 88 to the repeat rotator 10, with its rear end on the leading side. In this conjunction, if the front end of the subsequent document 1' is detected by the sensor 11, the rotation of the first feed rollers 87, 88 is stopped, and thus said subsequent document ' is caused to stand by.

When passed through document scanning and guided to the reversal feed track 25, the document 1' is conveyed further by the second feed rollers 57, 58 in same direction. If the sensor 59, which is disposed on the entry side of the second feed rollers 57, 58, detects the front end of the document 1', said feed rollers are rotated in direction a, and thus, the document 1' is further conveyed in the direction of its ongoing travel.

Subsequently, when the rear end of the document 1' in the direction of feed is detected by the sensor 59, the second feed rollers 57, 58 are driven reverse to its previous direction of rotation, that is, in direction a, so that the document 1' is conveyed along the reversal feed track 55 in the reverse direction. At this moment, the first feed rollers 87, 88 are also driven in direction b. Accordingly, the document 1', reversed in direction of feed, is conveyed, under the action of the first and second feed rollers 87, 7, through the feed rollers 8, 9 to the repeat rotator 10 so that its surface image is turned upward.

According to the document feed device described above, documents loaded are conveyed forward sequentially from the uppermost one, and each document so conveyed is either fed directly to the scanning position, or fed to the scanning position after feed reversal by a changeover means; and after scanning, the document is discharged on to the loading board, with its scanned surface up. Therefore, the device may be used not only for automatic document feeder purposes, but also as a recirculating document handler which enables page arrangement of copies. Furthermore, the device can perform copying of not only single-sided documents, but double-sided copies as well.

Further, after feed reversal, documents are conveyed through the feed passage to the document scanning position. This reduces the transport path.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A document feeding device comprising a document loading board for loading thereon a multiplicity of documents to be copied, a separator-feeder means for separating and conveying from said loading board the documents thereon sequentially from the lowermost one thereof, a document circulating transport passage for transporting said documents to be copied to a document scanning position and back to said document loading board, a document transport means for transporting each document conveyed by said separator-feeder means along a feed passage of said document circulating transport passage to said document scanning position, said document transport means comprising a drum-shaped rotator for transporting each document while being held onto an outer periphery of said drum-shaped rotator, a take-off transport means including a take-off passage which returns each document after it is scanned at said document scanning position back to said document loading board by way of a document reversal take-off passage portion of said document circulating transport passage onto the uppermost document of said loading board so that the document is placed with its image face on the same side as the document on said loading board and means for adjusting the length of said document circulating transport passage in response to the size of said document to be copied between said document loading board and said document scanning position, which adjusting means also adjusts the length of said reversal take-off passage of said document circulating transport passage.

2. A document feeding device comprising a document loading board for loading thereon a multiplicity of documents to be copied, a separator-feeder means for separating and conveying from said loading board the documents thereon sequentially from the lowermost one thereof, a document circulating transport passage for transporting said documents to be copied to a document scanning position and back to said document loading board, a document transport means for transporting each document conveyed by said separator-feeder means along a feed passage of said document circulating transport passage to said document scanning position, said document transport means comprising a drum-shaped rotator for transporting each document while being held onto an outer periphery of said drum-shaped rotator, a take-off transport means for returning a document which has been scanned through said scanning position back to said document loading board by way of a document reversal take-off passage portion of said document circulating transport passage onto the uppermost document on said loading board so that the document may be placed with its image face on the same side as the document on said loading board, a guide transport means including said feed passage of said document circulating transport passage for transporting and guiding a document fed by said separator-feeder means to said scanning position, a document reverse transport means including a first reverse feed passage which branches from said transport passage leading to said feed passage of said guide transport means and which reverses the direction of travel of the document, said first reverse feed passage communicating with a document feed reversal track for redirecting said document to said guide transport means, a second reverse feed passage which branches from a take-off passage of said take-off transport means and leads to said document reverse transport means, changeover means provided at said respective first and second reverse passages for changing the path of document travel, and means for adjusting the length of said first and second reverse feed passages.

3. A document feeding device comprising a document loading board for loading thereon a multiplicity of documents to be copied, a separator-feeder means for separating and conveying from said loading board the documents thereon sequentially from the lowermost one thereof, a document circulating transport passage for transporting said documents to be copied to a document scanning position and back to said document loading board, a document transport means for transporting each document conveyed by said separator-feeder means along a feed passage of said document circulating transport passage to said document scanning position, said document transport means comprising a drum-shaped rotator for transporting each document while being held onto an outer periphery of said drum-shaped rotator, a take-off transport means for returning a document which has been scanned through said scanning position back to said document loading board by way of a document reversal take-off passage portion of said document circulating transport passage onto the uppermost document on said loading board so that the document may be placed with its image face on the same side as the document on said loading board, a guide transport means including said feed passage of said document circulating transport passage for transporting and guiding a document fed by said separator-feeder means to said scanning position, a document reverse transport means including a first reverse feed passage which branches from said transport passage leading to said feed passage of said guide transport means and which reverses the direction of travel of the document, said first reverse feed passage communicating with a document feed reversal track for redirecting said document to said guide transport means, a second reverse feed passage which branches from a take-off passage of said take-off transport means and leads to said document reverse transport means, a first changeover means for directing said document to either said guide transport means or said document reverse transport means positioned prior to said document scanning position and a second changeover means for directing said document either to said reversal take-off passage or to said document reverse guide means positioned after said document scanning position and means for adjusting the length of said document circulating transport passage between said document loading board and said document scanning position and for adjusting the length of said reverse feed passages, said adjusting means also simultaneously adjusting the length of said reversal take-off passage of said document circulating transport passage, in response to the size of said document to be copied.

* * * * *